US007853502B2

(12) United States Patent
Marsan et al.

(10) Patent No.: US 7,853,502 B2
(45) Date of Patent: *Dec. 14, 2010

(54) SYSTEM AND METHOD FOR PROCESSING RETRIEVAL REQUESTS

(75) Inventors: Thomas Marsan, Dallas, TX (US); Jeffery Brown, Coppell, TX (US)

(73) Assignee: Paymentech, L.P., Dallas, TX (US)

( * ) Notice: Subject to any disclaimer, the term of this patent is extended or adjusted under 35 U.S.C. 154(b) by 335 days.

This patent is subject to a terminal disclaimer.

(21) Appl. No.: 12/004,538

(22) Filed: Dec. 20, 2007

(65) Prior Publication Data

US 2008/0109340 A1     May 8, 2008

Related U.S. Application Data

(63) Continuation of application No. 09/413,728, filed on Oct. 6, 1999, now Pat. No. 7,313,542.

(51) Int. Cl.
    *G06Q 40/00*      (2006.01)
(52) U.S. Cl. ........................................................ 705/35
(58) Field of Classification Search ..................... 705/35
See application file for complete search history.

(56) References Cited

U.S. PATENT DOCUMENTS

| 5,432,326 | A | * | 7/1995 | Noblett et al. ............... 235/380 |
| 5,479,530 | A | | 12/1995 | Nair et al. |
| 5,532,464 | A | | 7/1996 | Josephson et al. |
| 5,561,282 | A | | 10/1996 | Price et al. |
| 5,678,046 | A | | 10/1997 | Cahill et al. |
| 5,813,009 | A | | 9/1998 | Johnson et al. |
| 5,860,008 | A | | 1/1999 | Bradley |
| 6,317,729 | B1 | | 11/2001 | Camp et al. |

FOREIGN PATENT DOCUMENTS

JP      405242338 A      9/1993

OTHER PUBLICATIONS

"Anonymous Delivery of Goods in Electronic Commerce," (IBM Technical Disclosure Bulletin, 1996).

* cited by examiner

*Primary Examiner*—James P Trammell
*Assistant Examiner*—Scott S Trotter
(74) *Attorney, Agent, or Firm*—Jackson Walker L.L.P.; Christopher J. Rourk (57) ABSTRACT

A system for processing transaction data is provided. The system includes a substitute draft system that receives a retrieval request and generates a substitute draft in response to the retrieval request. The system also includes a merchant interface that is connected to the retrieval system. The merchant interface generates a merchant request in response to the retrieval request. The system thus allows a substitute draft to be generated in response to the retrieval request that may eliminate the need for a merchant response with a sales draft to the request. The system provides for higher and more efficient completion of retrieval requests by ensuring that such retrieval requests receive at least a substitute draft response. By providing at least a substitute draft response to the card user, a chargeback for no response is avoided.

20 Claims, 3 Drawing Sheets

FIGURE 4B

SYSTEM AND METHOD FOR PROCESSING RETRIEVAL REQUESTS

CROSS REFERENCE TO RELATED APPLICATION

This application is a continuation application of U.S. patent application Ser. No. 09/413,728, filed on Oct. 6, 1999, entitled "System and Method for Processing Retrieval Requests," now U.S. Pat. No. 7,313,542, the entire contents of which is incorporated herein by reference.

FIELD OF THE INVENTION

The present invention pertains to electronic payment transaction processing, and more particularly to a system for processing a sales draft retrieval request that allows a substitute draft to be automatically generated where suitable.

BACKGROUND

Electronic payment transactions are known in the art. Such electronic payment transactions typically involve transfers of funds or sales transactions. Electronic fund transfers occur between financial institutions, and may be implemented by the financial institutions or by individual users, such as checking account holders that use electronic bill payment software. Sales transactions may be implemented by a variety of merchants. For example, mail-order merchants may receive orders via telephone or the Internet, including credit card data. Point-of-sale merchants may accumulate credit card data and transfer the accumulated credit card data to a credit card payment processor for handling. Many other electronic payment transactions are also known. For example, some of these electronic payment transactions have been standardized according to the Electronic Data Interchange (EDI) standard, which is used by businesses to format electronic data files for financial transactions as well as other transactions.

Electronic payment transactions simplify the processing of electronic payments, but may result in merchant handling errors or card user abuse, such as fraud. For such errors or abuse, it is necessary to have a system for processing transactions that have been questioned by the card user. Such systems typically require an operator to interface with the user. An operator may not be able to effectively analyze such problems, which typically require a significant amount of time to resolve and may still not be resolved adequately after operator handling.

For example, if a credit card account holder challenges a sales transaction, it may be necessary to obtain a copy of the original sales draft or charge authorization for the transaction, through what is known as a retrieval request. This sales draft is typically kept by the merchant for 18 months after the transaction, and it is therefore necessary to relay the retrieval request from the credit card user to the issuing bank of the credit card, then to a credit card organization such as Visa™ or MasterCard™, then to a payment processor for merchants, and finally to the merchant. In many cases, the merchant may be unable to provide the sales draft when requested by the card-issuing financial institution. Thus, protocols for dealing with retrieval requests may cause either the credit card account holder or the merchant to suffer a loss even when it may be possible to reconcile the challenged charge.

SUMMARY OF THE INVENTION

In accordance with the present invention, a system and method for processing a retrieval request are provided that overcome the problems and deficiencies of known systems and methods for processing a retrieval request.

In particular, a system and method for processing a retrieval request are provided that allow substitute drafts to be generated for predetermined retrieval requests when it is possible that the substitute draft may be adequate to reconcile the challenged charge either in lieu of or prior to the receipt of a sales draft.

In accordance with an exemplary embodiment of the present invention, a system for processing transaction data is provided. The system includes a substitute draft system that receives a retrieval request and generates a substitute draft in response to the retrieval request. The system also includes a merchant interface that is connected to the substitute draft system. The merchant interface generates a merchant request in response to the retrieval request. The system thus allows a substitute draft to be generated in response to the retrieval request that may eliminate the need for a merchant to produce a stored sales draft, and also provides for completion of retrieval requests by ensuring that such retrieval requests receive at least a substitute draft response back to the card account holder.

The present invention provides numerous important technical advantages. One important technical advantage of the present invention is a system for processing a retrieval request that allows a substitute draft to be generated before the sales draft is retrieved and submitted by the merchant. The substitute draft may be sufficient to reconcile the challenged charge, thus allowing the charge to be reconciled even if the merchant inadvertently fails or is unable to provide the sales draft.

Those skilled in the art will further appreciate the advantages and superior features of the invention together with other important aspects thereof on reading the detailed description which follows in conjunction with the drawings.

DETAILED DESCRIPTION OF PREFERRED EMBODIMENTS

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

Figure 1:
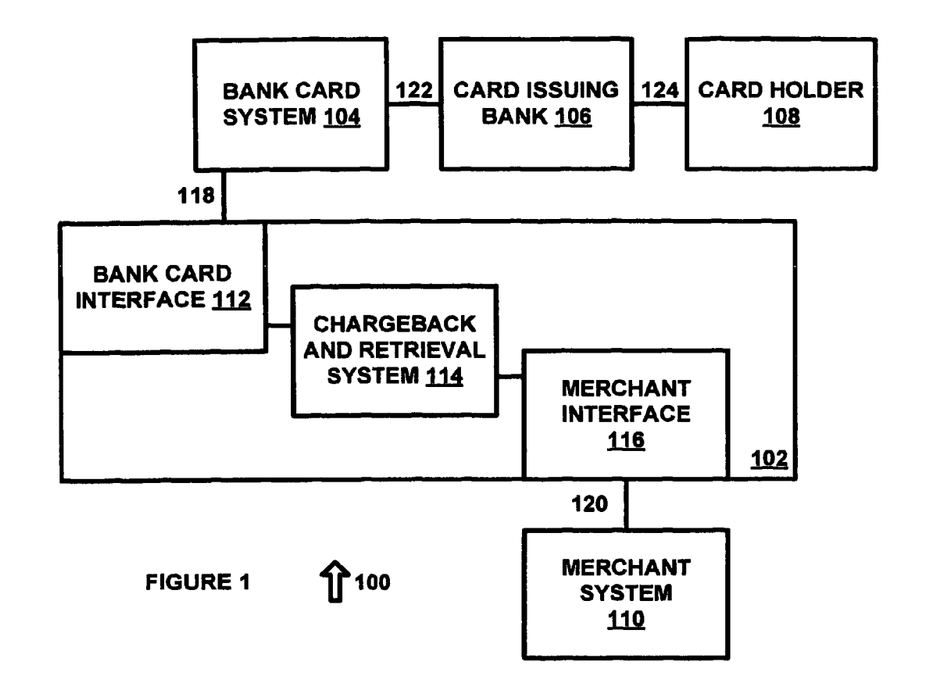
FIG. 1 is a diagram of a system for processing retrieval requests in accordance with an exemplary embodiment of the present invention.

FIG. 1 is a diagram of a system 100 for processing retrieval requests in accordance with an exemplary embodiment of the present invention. System 100 may be used to generate a substitute draft in response to a retrieval request so as to expedite handling of the retrieval request.

System 100 includes transaction system 102. Transaction system 102 may be implemented in hardware, software, or a suitable combination of hardware and software, and may be a server system operating one or more software systems, including server operating system software systems. As used in this application, a software system may be implemented by one or more lines of code operating on a processor, one or more lines of code operating on two or more processors, an object that is transferred between processors using predetermined communications protocols, one or more subroutines operating on one or more processors or servers, or other suitable software systems.

Transaction system 102 is operable to receive a retrieval request that may be generated when a sales charge is challenged by a card user, and to generate a substitute draft and a merchant request in response to the retrieval request. Transaction system 102 is further operable to track the status of the merchant request, such that if mediation of the challenged charge occurs, then the merchant may be assessed the mediation charge if the merchant has failed to provide a sales draft in response to the merchant request.

System 100 also includes merchant system 110. Merchant system 110 may be implemented in hardware, software, or a suitable combination of hardware and software, and may be a server system operating one or more software systems, including a server operating system. Merchant system 110 is coupled to transaction system 102 by communications medium 120. As used in this application, the term couple and its cognate terms such as coupled and coupling, may refer to a physical connection (such as a data bus or copper conductor), a virtual connection (such as randomly assigned memory locations in a memory storage device), a logical connection (such as through logical devices of a semiconducting component), other suitable connections, or a combination of such connections. For example, coupling may occur through one or more intervening components or devices.

Merchant system 110 is operable to receive the merchant request from transaction system 102, and to generate a response to the merchant request. In one exemplary embodiment, merchant system 110 receives a merchant request from transaction system 102 in the form of an electronic mail message, an EDI data file, facsimile data, or in other suitable manners. Merchant system 110 then generates a response that includes the sales draft that authorized the disputed transaction. For example, the response may include an electronic sales draft file and associated data for a transaction. The response may also or alternatively include a report that is used by an operator to manually retrieve a copy of the sales draft. The sales draft may then be copied and transmitted by facsimile, a postal service, or other suitable means to transaction system 102. In this manner, merchant system 110 is operable to respond to the retrieval request either automatically or in combination with the performance of manual steps by an operator.

System 100 also includes bank card system 104. Bank card system 104 may be implemented in hardware, software, or a suitable combination of hardware and software, and may be a server system that includes general purpose server operating system software and other special purpose server software for interacting with transaction system 102. Bank card system 104 is operable to receive a retrieval request from bank system 106 over communications medium 122 and to transmit the retrieval request to transaction system 102 over communications medium 118. In one exemplary embodiment, bank card system 104 may receive an EDI data file from bank system 106, and may then process the EDI data file to isolate pertinent records for transaction system 102. These records are then compiled into a different EDI data file which is transmitted to transaction system 102.

System 100 also includes bank system 106. Bank system 106 may be implemented in hardware, software, or a suitable combination of hardware and software, and may be a server operating one or more software systems, including general purpose server operating systems and special purpose bank systems that are used to generate a retrieval request. In one exemplary embodiment, bank system 106 is configured to receive disputed items from card user 108 via communications medium 124. Bank system 106 then generates a retrieval request depending upon the nature of the disputed item. For example, some disputed items will not result in the generation of a retrieval request, but will result in an immediate chargeback from the card user to the merchant. Bank system 106 may also include a user interface that receives commands from an operator that verbally communicates with card user 108 over a communications medium 124 such as a telephone line.

Communications media 118, 120, 122, and 124 are used to transfer data between transaction system 102, merchant system 110, bank card system 104, bank system 106, and card user 108. These communications media may be implemented by a single comprehensive communications medium, such as the Internet or a Public Switched Telephone Network (PSTN). Likewise, other suitable communications media may be used, such as a combination of PSTN telephone lines, microwave or other wireless communications media, electronic mail, or by transmitting data by hard copy such as through a postal service. For example, card user 108 may transmit a disputed charge to bank system 106 by mailing a letter disputing the charge. An operator at the bank system 106 may then input relevant data to initiate the retrieval request. Merchant system 110 may transmit a hardcopy of the sales draft to transaction system 102 by using a postal service as communications medium 120. Other suitable communications media may also be used.

Transaction system 102 also includes a substitute draft system, such as chargeback and retrieval system 114. Chargeback and retrieval system 114 may be implemented in hardware, software, or a suitable combination of hardware and software, and may be one or more software systems operating on transaction system 102. Chargeback and retrieval system 114 is operable to receive a retrieval request from bank card interface 112 and to process the retrieval request to determine whether a substitute draft may be generated. For example, the retrieval request may include a retrieval request code that signifies whether a substitute draft may be submitted. Chargeback and retrieval system 114 will then generate a substitute draft for each retrieval request having a suitable retrieval request code. Likewise, the retrieval request may have a retrieval request code that indicates that generation of a substitute draft is not acceptable. In such cases, chargeback and retrieval system 114 will not generate a substitute draft. The retrieval request may also include a retrieval request code that indicates that a substitute draft may be generated depending upon predetermined data that is submitted with the retrieval request, such as the bank card system, the bank system, the card user requesting the substitute draft, the amount of the challenged transaction, or other data. Chargeback and retrieval system 114 is operable to use these predetermined criteria to determine whether to generate a substitute draft. In this manner, chargeback and retrieval system 114 may controllably generate substitute drafts in situations where such generation of substitute drafts is appropriate.

Transaction system 102 also includes bank card interface 112 and merchant interface 116. Bank card interface 112 is operable to interface between bank card system 104 and chargeback and retrieval system 114. Merchant interface 116 is operable to receive data from chargeback and retrieval system 114, and to determine whether generation of a merchant request is required. For example, merchant interface 116 may generate a merchant request that includes data that will be used by the merchant to identify the sales draft required. If chargeback and retrieval system 114 generates a substitute draft in situations where no merchant sales draft is required, then a merchant request is not generated by merchant interface 116.

Merchant interface 116 is also operable to determine whether the merchant system 110 has returned a sales draft in response to the merchant request. For example, if the merchant sales draft includes an electronic signature file transmitted by electronic means, then merchant interface 116 may be operable to receive the file, verify the contents, and transmit the file to chargeback and retrieval system 114. Likewise, merchant interface 116 may include an operator interface that allows an operator to retrieve a physical copy of the sales draft and to enter suitable data for transmission to chargeback and retrieval system 114 indicating that the merchant sales draft is being forwarded to bank system 106.

In operation, system 100 is used to process retrieval requests, generate substitute drafts, generate merchant requests, transmit sales drafts, and verify receipt of the sales draft. In one exemplary embodiment, card user 108 receives a credit card statement. For example, the credit card statement may be received via an online service, by dialing over the PSTN, by a postal service, or in other suitable manners. Card user 108 then transmits disputed charge data to bank system 106 via communications medium 124. Bank system 106 receives the disputed charges and generates a retrieval request for the sales draft for the card user. This retrieval request is then transmitted to bank card system 104 via communications medium 122.

After receiving the retrieval request, bank card system 104 may either transmit the retrieval request directly to transaction system 102 via communications medium 118, or may perform processing on the retrieval request, such as to extract all records for transaction system 102 from all bank systems 106 that transmit such retrieval requests to bank card system 104. After the retrieval request is received at transaction system 102, chargeback and retrieval system 114 generates a substitute draft where appropriate. For example, some retrieval requests may include data that indicates that a substitute draft should not be generated. Other retrieval requests may include data that requires cross-referencing to a database to determine whether a substitute draft should be generated. Still other retrieval requests will always result in generation of a substitute draft based upon the retrieval code or other suitable data.

After a substitute draft is generated by chargeback and retrieval system 114, merchant interface 116 may generate a merchant request for transmission to merchant system 110 over communications medium 120. The generation of the merchant request and the substitute draft may occur in any order. Alternatively, transaction system 102 may be configured such that no substitute drafts are generated after a merchant request has been generated. In such a configuration, the substitute draft will always be transmitted before the merchant request.

After receiving the merchant request, merchant system 110 retrieves the sales draft for transmission to transaction system 102. For example, the sales draft may be a data file that includes encoded data that may be reconstructed according to predetermined encryption techniques to show the customer's signature, fingerprint, retina, or other unique identifying data. The sales draft may also include a hard copy of the customer's signed sales authorization. This hard copy may also be transmitted directly to bank card system 104. After merchant system 110 has generated a sales draft, merchant interface 116 may receive data from the merchant system indicating that a sales draft has been sent. This data may then be transmitted from chargeback and retrieval system 114 to bank card system 104, bank system 106, and ultimately to card user 108.

If no sales draft is received from merchant system 110, or if the substitute draft generated by chargeback and retrieval system 114 does not resolve the dispute for card user 108, then the card user may seek to charge back the sale to the merchant. In the event of a chargeback, if merchant system 110 has not transmitted a sales draft within a predetermined time, then the charge may be automatically posted against merchant system 110. Chargeback and retrieval system 114 is operable to receive chargeback data from bank card system 104 or other suitable places, and to determine whether merchant system 110 has generated the sales draft. If the sales draft has been generated, then transaction system 102 and chargeback and retrieval system 114 transmit suitable data to bank card system 104 that indicates that a sales draft has been transmitted. Alternatively, if no sales draft has been submitted, merchant interface 116 posts a charge against merchant system 110 for failure to provide a sales draft.

Thus, system 100 may be used to automatically process retrieval requests, substitute drafts, sales drafts, and chargeback data with limited or no operator involvement. System 100 therefore increases the reliability of retrieval request fulfillment, and further allows individual retrieval requests to be cross-referenced against databases in a manner that would otherwise not be possible if operators were processing the retrieval requests manually. Furthermore, system 100 allows retrieval requests to be tracked so that the status of a retrieval request may be readily determined.

Figure 2:
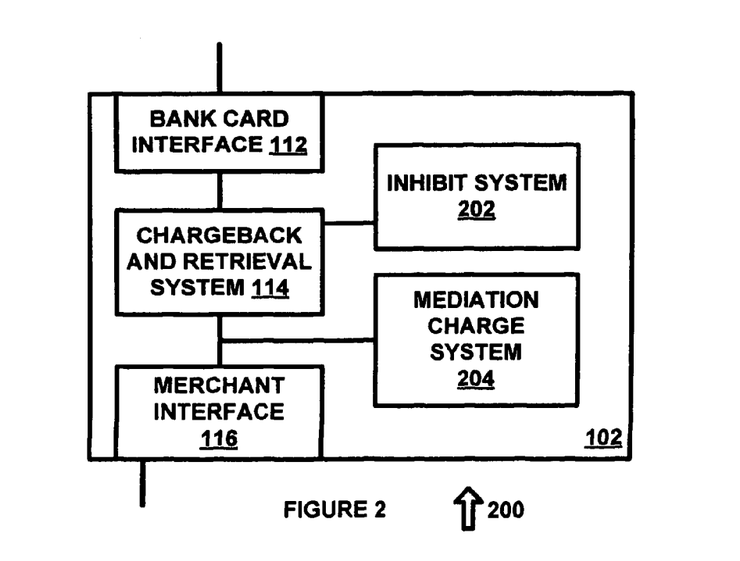
FIG. 2 is a diagram of a transaction system in accordance with an exemplary embodiment of the present invention.

FIG. 2 is a diagram of a substitute draft system 200 in accordance with an exemplary embodiment of the present invention. Substitute draft system 200 may be used to issue substitute drafts in an electronic payment system such as system 100.

Transaction system 102 of substitute draft system 200 includes inhibit system 202 which is coupled to chargeback and retrieval system 114. Inhibit system 202 may be implemented in hardware, software, or a suitable combination of hardware and software, and may be one or more software systems operating on transaction system 102. Inhibit system 202 may include a database that stores data that is cross-referenced to retrieval requests, to determine whether a substitute draft should be generated. For example, inhibit system 202 may include retrieval code numbers that identify retrieval codes from which substitute drafts should not be generated. When a retrieval request is received at chargeback and retrieval system 114, inhibit system 202 prevents the generation of a substitute draft for such retrieval codes. Likewise, predetermined transactions, card users, bank systems, sales agencies, disputed charge amounts, or other suitable data may be used to inhibit the generation of a substitute draft. For example, certain merchant classes may be identified wherein a sales draft is always required and a substitute draft will not be accepted. Likewise, if more than one retrieval request is received from a card user within a predetermined time period, then generation of a substitute draft may also be inhibited. Bank system 106 may also use predetermined criteria for generation of substitute drafts that are checked for each retrieval request. Inhibit system 202 provides a database for storing such request-specific data to facilitate generation of substitute drafts only in situations where substitute draft generation is appropriate.

Substitute draft system 200 also includes mediation charge system 204. Mediation charge system 204 may be implemented in hardware, software, or a suitable combination of hardware and software, and may be one or more software systems operating on transaction system 102. Mediation charge system 204 is operable to assess mediation charges according to predetermined criteria. For example, mediation charge system 204 may be configured to receive a mediation charge from chargeback and retrieval system 114 and to determine whether a sales draft has been received at merchant interface 116 in response to a merchant request. If mediation charge system 204 determines that no merchant request has been generated, or that a sales draft has been submitted in response to the merchant request within a predetermined time, then mediation charge system 204 may generate suitable data notifying the bank card system or other suitable system of the transmission of the sales draft. If a sales draft has been transmitted and lost, it may be retransmitted. Likewise, if the merchant request was not transmitted, then the mediation charge may have been assigned in error, and a suitable data message is generated.

If a merchant request has been generated and has not been responded to, then the merchant system 110 that has failed to respond to the merchant request may be assessed the mediation charge. Mediation charge system 204 is operable to assess such charges against the merchant, to generate data for transmission to the merchant notifying them of the charge assessment, and to perform other suitable functions.

In operation, substitute draft system 200 allows transaction system 102 to process retrieval requests in a predetermined manner, independently of merchants, sales agencies, banks, and card users. Substitute draft system 200 provides for automatic generation of substitute drafts where suitable, automatic generation of merchant requests where suitable, and automatic processing of mediation charges where suitable. Substitute draft system 200 thus allows retrieval requests to be tracked and fulfilled in a more efficient manner than manual processing, resulting in increased percentages of completed retrieval requests. Inhibit system 202 allows retrieval request criterion to be stored and modified as a function of bank card agency, bank, and card user, thus ensuring that substitute draft generation occurs according to such predetermined criterion. This results in a lower error rate for generation of substitute drafts and further increases the percentage of retrieval request completions.

Figure 3:
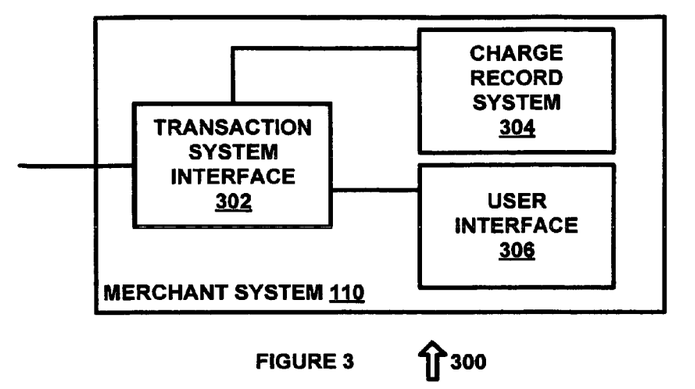
FIG. 3 is a diagram of a system for processing merchant data in accordance with an exemplary embodiment of the present invention.

FIG. 3 is a diagram of a system 300 for processing merchant data in accordance with an exemplary embodiment of the present invention. System 300 receives merchant requests and generates sales draft data.

System 300 includes transaction system interface 302. Transaction system interface 302 may be implemented in hardware, software, or a suitable combination of hardware and software, and may be one or more software systems operating on merchant system 110. Transaction system interface 302 is operable to receive data from transaction system 102 and to transmit data to transaction system 102 in response to the data received. For example, transaction system interface 302 may receive merchant requests, and may transmit suitable data in response to the merchant request. Transaction system interface 302 may also be configured to transmit and receive other transaction data where suitable, such as EDI data, card user charge data, or other suitable data.

System 300 includes charge record system 304. Charge record system 304 may be implemented in hardware, software, or a suitable combination of hardware and software, and may be an electronic signature data storage system that is configured to store signature data for card users at a point of purchase. For example, when a card user uses a credit card to conduct a purchase, charge record system 304 may create an electronic record of all pertinent data for the purchase, such as items purchased, time of purchase, and amount charged, and may also create a file or data field for storing signature data for the card user. The card user may then be provided with a signature pad and pen that will generate electronic data that can be used to regenerate the card user's data on a display device. Also or alternatively, a digital camera, fingerprint reader, retina scanner, or other identification device may be used to generate identification data. Charge record system 304 may also include other suitable systems, such as a system that retrieves a record number indicating where a physical record has been filed so that the merchant operator may retrieve the physical record from the physical record file.

User interface 306 is coupled to transaction system interface 302. User interface 306 is operable to display data to a user and to receive user-entered data in response. For example, user interface 306 may be implemented where physical records are kept of each sales draft, such that the user may send an electronic mail message or other suitable message to transaction system 102 after a physical copy of the sales draft has been made and placed in the mail, transmitted by facsimile, or otherwise transmitted. In this manner, user feedback may be received where sales draft data is not transmitted electronically. Likewise, user interface 306 may allow the draft to be faxed such that an electronic file with a fax image may be transmitted over transaction system interface 302 to transaction system 102.

In operation, system 300 is used to receive merchant requests and to transfer sales draft data in accordance with an exemplary embodiment of the present invention. System 300 may be used to transmit an electronic file that is generated at the time of sale that contains all sales draft data. Likewise, system 300 may be used to transmit hard copy data via facsimile, scanning, or by other suitable processes so as to provide the sales draft data to the user. In this manner, system 300 interfaces with a transaction system 102 and indirectly with bank card systems 104, bank systems 106, and users 108.

Figure 4A:
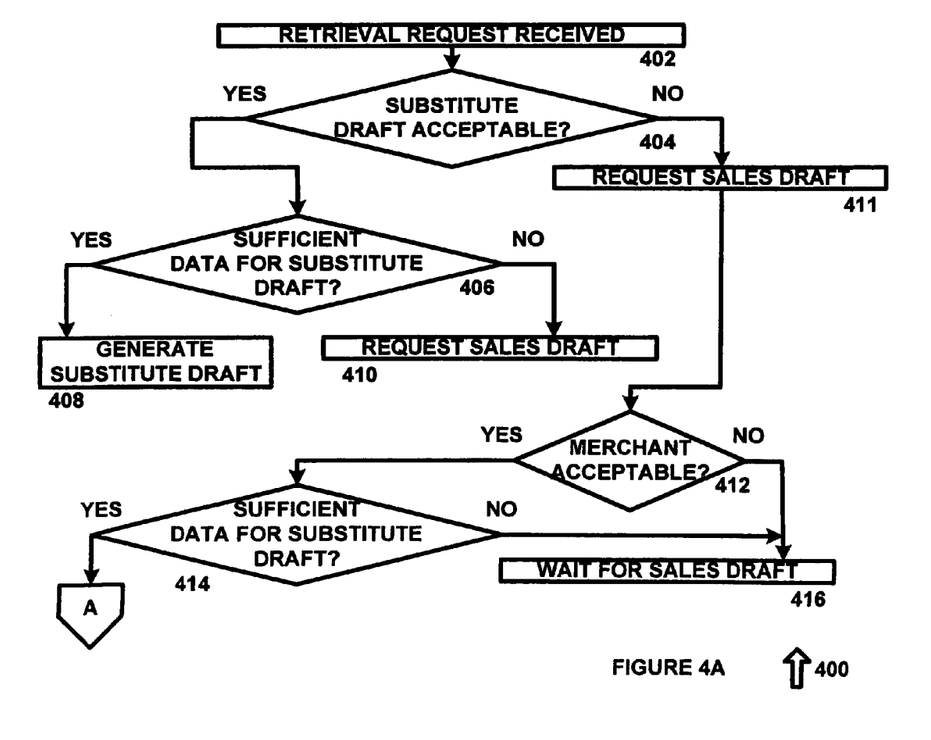
FIGS. 4A and 4B are a flowchart of a method for processing a retrieval request in accordance with an exemplary embodiment of the present invention.
Figure 4B:
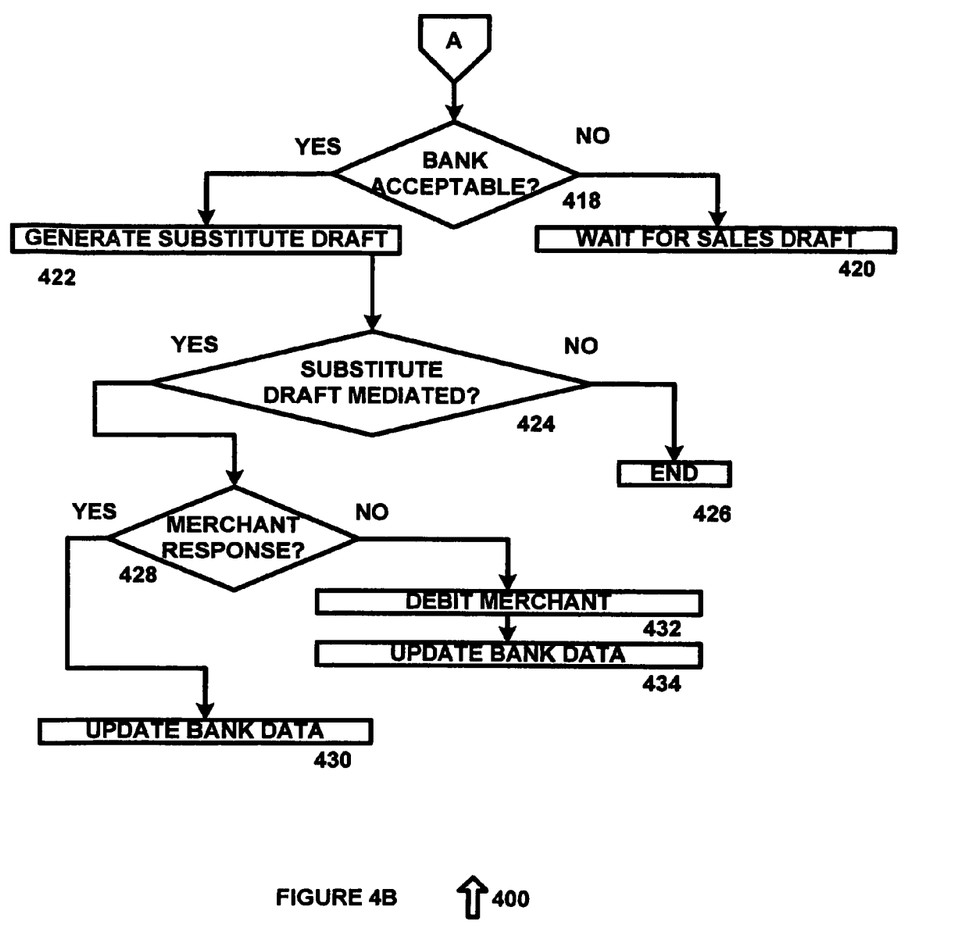

FIGS. 4A and 4B are a flowchart of a method 400 for processing a retrieval request in accordance with an exemplary embodiment of the present invention. Method 400 may be used to process retrieval requests and sales transactions where a disputed sales charge requires retrieval of a sales draft.

Method 400 begins at 402 where a retrieval request is received. In one exemplary embodiment, the retrieval request is generated by a card holder and transmitted to an issuing bank, which then transmits the retrieval request to a bank card system, and which is ultimately received at a transaction processor, which handles sales transaction processing for merchants. The method then proceeds to 404 where it is determined whether it would be acceptable to send a substitute draft. If a retrieval request code allows a substitute draft to be transmitted for every instance in which the retrieval request code is used, then the method proceeds to 406.

At 406, it is determined whether sufficient data exists to generate a substitute draft. In some applications, a substitute draft may require data that has not been submitted or received by the transaction processor, or which the transaction processor is not reasonably able to obtain from an alternate source such as data files maintained by the transaction processor. If it is determined at 406 that this required data is not available, then the method proceeds to 410 where a sales draft is requested from the merchant. A sales draft may be requested by transmitting an EDI data file, facsimile data, an electronic mail message, a hardcopy request via postal carrier, or other suitable means. It is determined at 406 that sufficient data for a substitute draft exists, then the method proceeds to 408. At

408, a substitute draft is generated. For example, the substitute draft may be generated by adding an entry into an EDI data file for transmission to the issuing bank or other suitable entities.

If it is determined at 404 that a substitute draft is not acceptable, then the method proceeds to 411 where a sales draft is requested. For example, the sales draft may be requested by transmitting an EDI data file, a facsimile message, an electronic mail message, a hardcopy request via postal carrier, or other suitable means. The method then proceeds to 412.

At 412, is determined whether the merchant is acceptable. For example, transmitting a substitute draft may be acceptable for certain merchants or classes of merchants, or in certain circumstances. Likewise, transmitting a substitute draft may not be allowable for other merchants or classes of merchants, or for transactions that may have additional data requirements or restrictions that prevent a substitute draft from being transmitted. If it is determined at 412 that the merchant is acceptable, then the method proceeds to 414. Otherwise, the method proceeds to 416 where the sales draft information is transmitted from the merchant to the issuing bank, either directly or through intermediate parties.

At 414, it is determined whether sufficient data exists to generate a substitute draft. For example, it may be necessary to transmit predetermined data for a substitute draft, such as the card holder's name, the merchant's receipt number, or other suitable data. If it is determined at 414 that sufficient data for a substitute draft is not available, then the method proceeds to 416 where the sales draft from the merchant is awaited. Otherwise the method proceeds to 418.

At 418, it is determined whether the issuing bank is acceptable. Some issuing banks may allow a substitute draft to be submitted under predetermined circumstances. Likewise, other issuing banks might not allow a substitute draft to be submitted, in which case the substitute draft should not be transmitted as it may result in additional fees being levied against the transaction system. If it is determined at 418 that the issuing bank is not acceptable, then the method proceeds to 420 where the sales draft is awaited. Otherwise, the method proceeds to 422.

At 422, a substitute draft is generated. The substitute draft may be generated by creating a data entry in an EDI data file, by generating an electronic mail message, by transmitting facsimile data, by transmitting a document via postal carrier, or by other suitable means. The substitute draft is then transmitted to the issuing bank for use in resolving the retrieval request. For example, some retrieval requests may be generated due to an allegation of fraud, mistake, or other reasons. For such retrieval requests, the substitute draft may provide sufficient data for the card user or the issuing bank to determine whether the contested charge was correct.

After the substitute draft has been transmitted at 422, the method proceeds 424 where it is determined whether the substitute draft has been mediated. For example, if the substitute draft is determined to be unacceptable, then the issuing bank may elect to mediate the substitute draft. If it is determined at 424 that the substitute draft has not been mediated then the method proceeds to 426 and terminates. Otherwise, the method proceeds to 428.

At 428, it is determined whether a merchant response to be sales draft has been received. If a merchant response has been received, then the method proceeds to 430 where an issuing bank data record is updated. For example, issuing bank data may be stored to that indicates whether an issuing bank will mediate a substitute draft under the particular circumstances involved. Likewise, the issuing bank data may be flagged so that the issuing bank may be contacted to obtain permission for submitting the substitute draft under the particular circumstances.

If it is determined at 428 that a merchant response has not been received, then the method proceeds to 432. At 432, the merchant is debited for failure to provide a sales draft in response to a retrieval request. The method then proceeds to 434, where the issuing bank data is updated. As previously described, the issuing bank data may be updated to indicate that the issuing bank should not receive a substitute draft in similar circumstances, to obtain approval for providing a substitute draft in such circumstances, or for other suitable purposes.

In operation, method 400 is used to process retrieval requests so as to coordinate the generation of substitute drafts and the transmission of sales drafts. Typically, a retrieval request will require the production of a sales draft authorizing the transaction. In lieu of a sales draft though, it is often possible to resolve disputes regarding a contested transaction by providing a substitute draft with additional information. The present method allows such substitute drafts to be transmitted in parallel with notification of the merchant for production of a sales draft. In this manner, it may be possible to resolve the disputed charge without production of the sales draft.

In the event that the substitute draft does not resolve the disputed charge, it is still possible that the merchant may have provided the sales draft within a prescribed period for resolution of the dispute. If a merchant neglects to produce the sales draft within that time, and the user does not contest the charge after receiving the substitute draft, then the merchant will not be assessed any charges for failure to respond. By providing a substitute draft in these situations, the user has received sufficient information to determine whether to contest the charge, but the merchant is not held liable for failure to respond in a timely manner.

Likewise, if the card user receives the substitute draft and still is not satisfied as to the accuracy or appropriateness of the charge, the merchant has been notified of the request for a sales draft and has the full period of time allocated for providing a sales draft to respond to the merchant request. In this manner, card users are provided information in a timely manner and merchants are provided with protection against inadvertent failure to provide sales drafts on a timely manner. Thus, the present method provides advantages to both card users and merchants in sales transactions by increasing retrieval request fulfillment, decreasing the number of improperly contested transactions, and protecting against inadvertent failure to produce a sales draft.

Although preferred and exemplary embodiments of a system and method for processing retrieval requests have been described in detail herein, those skilled in the art will also recognize that various substitutions and modifications may be made to the systems and methods without departing from the scope and spirit of the appended claims.

What is claimed is:

1. A system for processing transaction data comprising:
   a substitute draft system electronically receiving a retrieval request and generating a substitute draft in response to the retrieval request using a data processing device;
   a merchant interface coupled to the substitute draft system, the merchant interface electronically transmitting a merchant request to a remote merchant system in response to the retrieval request; and
   a mediation charge system coupled to the merchant interface, the mediation charge system generating a merchant mediation charge if no response has been received to the merchant request within a predetermined period of time.

2. The system of claim 1 further comprising an inhibit system coupled to the substitute draft system, the inhibit system receiving the retrieval request and inhibiting the substitute draft system in response to predetermined data fields of the retrieval request to prevent the substitute draft system from generating the substitute draft.

3. The system of claim 1 further comprising a remote merchant system coupled to the merchant interface through a communications medium, the merchant system receiving the merchant request and generating an operator notification of the merchant request.

4. The system of claim 3 wherein the merchant system retrieves identification data in response to the merchant request and transfers the identification data to the merchant interface system.

5. The system of claim 1 further comprising a bank card system coupled to the substitute draft system, the bank card system transmitting the retrieval request to the substitute draft system and receiving the substitute draft.

6. The system of claim 5 further comprising a bank system coupled to the bank card system, the bank system generating the retrieval request and receiving the substitute draft from the bank card system.

7. The system of claim 1 wherein signature data associated with the retrieval request is not stored at the system for processing transaction data.

8. A method for processing a retrieval request comprising:
receiving the retrieval request at a data processing device;
generating a substitute draft if it is determined that a retrieval request code does not prohibit the generation of the substitute draft; and
transmitting a merchant request to a remote merchant system using one or more data transmission device in response to the retrieval request.

9. The method of claim 8 wherein generating the substitute draft if it is determined that the retrieval request code does not prohibit the generation of the substitute draft comprises generating a draft if it is determined that issuing bank data does not prohibit the generation of the draft.

10. The method of claim 8 wherein generating the substitute draft if it is determined that the retrieval request code does not prohibit the generation of the substitute draft comprises generating a draft if it is determined that bank card agency data does not prohibit the generation of the draft.

11. The method of claim 8 wherein generating the substitute draft if it is determined that the retrieval request code does not prohibit the generation of the substitute draft comprises generating a draft if it is determined that transaction amount data does not prohibit the generation of the draft.

12. The method of claim 8 wherein determining that the retrieval request code does not prohibit the generation of the substitute draft is performed prior to receiving the retrieval request.

13. The method of claim 8 wherein determining that the issuing bank data does not prohibit the generation of the substitute draft comprises determining that that the issuing bank does not prohibit the generation of the substitute draft prior to receiving the retrieval request.

14. The method of claim 10 wherein generating the draft if it is determined that bank card agency data does not prohibit the generation of the draft comprises determining that bank card agency does not prohibit the generation of the substitute draft prior to receiving the retrieval request.

15. The method of claim 11 wherein determining that the transaction amount data is not in a set of set of transaction amount data that would prohibit the generation of the draft is performed prior to receiving the retrieval request.

16. The method of claim 8 wherein generating the substitute draft if it is determined that the retrieval request code does not prohibit the generation of the substitute draft comprises generating a draft if it is determined that card user data does not prohibit the generation of the draft.

17. The method of claim 16 wherein determining that the card user data is not in a set of set of card user data that does not prohibit the generation of the draft is performed prior to receiving the retrieval request.

18. A system for processing transaction data comprising:
a bank system generating retrieval request data in response to user-entered data using a data processing device;
a remote bank card system receiving the retrieval request data from the bank system;
a transaction system coupled to the bank card system, the transaction system electronically receiving the retrieval request data from the bank card system and generating substitute draft data and merchant request data in response to the retrieval request data, wherein the transaction system generates mediation charge data if the merchant system has not generated sales draft data in response to the merchant request data within a predetermined time; and
a merchant system coupled to the merchant interface, the merchant system receiving the merchant request data and generating sales draft data in response to the merchant request data.

19. The system of claim 18 wherein the transaction system receives bank system data with the retrieval request data and generates the substitute draft data in response to the retrieval request data and the bank system data.

20. The system of claim 18 wherein the transaction system receives card user data with the retrieval request data and generates the substitute draft data in response to the retrieval request data and the card user data.

* * * * *

UNITED STATES PATENT AND TRADEMARK OFFICE
CERTIFICATE OF CORRECTION

| | | |
|---|---|---|
| PATENT NO. | : 7,853,502 B2 | Page 1 of 1 |
| APPLICATION NO. | : 12/004538 | |
| DATED | : December 14, 2010 | |
| INVENTOR(S) | : Thomas Marsan and Jeffery Brown | |

It is certified that error appears in the above-identified patent and that said Letters Patent is hereby corrected as shown below:

Col. 12, line 7 claim 13, please delete the second "that";

Col. 12, line 25 claim 17, please delete the second "set of".

Signed and Sealed this
Twenty-sixth Day of April, 2011

David J. Kappos
*Director of the United States Patent and Trademark Office*